(12) United States Patent
Shu et al.

(10) Patent No.: US 10,826,618 B2
(45) Date of Patent: *Nov. 3, 2020

(54) TUNING OPTOELECTRONIC TRANSCEIVERS IN OPTICAL NETWORK

(71) Applicant: FINISAR CORPORATION, Sunnyvale, CA (US)

(72) Inventors: Huade Shu, Shenzhen (CN); Jing Li, Shanghai (CN); Leo Yu-yu Lin, Shanghai (CN); Xiaoyan Huang, Shanghai (CN); Puhui Miao, Shanghai (CN); Bin Ma, Shanghai (CN)

(73) Assignee: II-VI Delaware Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/844,743

(22) Filed: Apr. 9, 2020

(65) Prior Publication Data
US 2020/0244371 A1 Jul. 30, 2020

Related U.S. Application Data

(63) Continuation of application No. 16/262,418, filed on Jan. 30, 2019, now Pat. No. 10,720,997.

(30) Foreign Application Priority Data

Jan. 9, 2019 (CN) .......................... 2019 1 0020012

(51) Int. Cl.
*H04B 10/00* (2013.01)
*H04B 10/61* (2013.01)
*H04B 10/40* (2013.01)

(52) U.S. Cl.
CPC ............. *H04B 10/61* (2013.01); *H04B 10/40* (2013.01)

(58) Field of Classification Search
CPC ........ H04B 10/40; H04B 10/61; H04B 10/27; H04B 10/07; H04B 10/503; H04B 10/572; H04B 10/272; H04B 10/07957; H04J 14/0257; H04J 14/0267; H04J 14/02; H04J 14/0221; H04J 14/0268; H04J 14/0282;
(Continued)

(56) References Cited

U.S. PATENT DOCUMENTS 6,157,818 A * 12/2000 Rode ...................... H04W 8/26
370/313
9,712,241 B2 * 7/2017 Mukai ................. H04J 14/0242
(Continued)

*Primary Examiner* — Hibret A Woldekidan
(74) *Attorney, Agent, or Firm* — Maschoff Brennan

(57) ABSTRACT

A method of tuning optoelectronic transceivers in an optical network may include powering on a first optoelectronic transceiver, setting a channel wavelength of the first optoelectronic transceiver, transmitting a first request command from the first optoelectronic transceiver through the optical network to a second optoelectronic transceiver, and noniteratively changing a channel wavelength of the first optoelectronic transceiver until a second request command is received from the second optoelectronic transceiver. The second request command may indicate to the first optoelectronic transceiver that the channel wavelength set by the first optoelectronic transceiver is able to travel through the optical network between the first optoelectronic transceiver and the second optoelectronic transceiver.

18 Claims, 10 Drawing Sheets

(58) Field of Classification Search
CPC .. H04J 14/0246; H04J 14/025; H04J 14/0228; H04J 3/1694
USPC .............................. 398/135, 138, 79, 67, 72
See application file for complete search history.

(56) References Cited

U.S. PATENT DOCUMENTS

| | | | | |
|---|---|---|---|---|
| 10,097,907 | B2* | 10/2018 | Dai | H04Q 11/0062 |
| 10,110,977 | B2* | 10/2018 | Ra | H04J 14/0258 |
| 2005/0163177 | A1* | 7/2005 | Kawanishi | H01S 5/02212 |
| | | | | 372/43.01 |
| 2008/0025277 | A1* | 1/2008 | Takatori | H04M 1/72505 |
| | | | | 370/338 |
| 2011/0138092 | A1* | 6/2011 | Morimoto | G06F 13/1605 |
| | | | | 710/244 |
| 2013/0269421 | A1* | 10/2013 | Tichborne | G08C 17/02 |
| | | | | 73/53.01 |
| 2015/0215035 | A1* | 7/2015 | Idemaru | H04B 10/272 |
| | | | | 398/38 |
| 2016/0381441 | A1* | 12/2016 | Nagamine | H04B 10/572 |
| | | | | 398/95 |
| 2017/0353268 | A1* | 12/2017 | Jung | H04J 14/02 |
| 2018/0131462 | A1* | 5/2018 | Yoshida | H04L 12/44 |
| 2019/0069055 | A1* | 2/2019 | Campos | H04J 3/0682 |

* cited by examiner

TUNING OPTOELECTRONIC TRANSCEIVERS IN OPTICAL NETWORK

CROSS-REFERENCE TO RELATED APPLICATIONS

This application is a continuation of U.S. patent application Ser. No. 16/262,418, filed on Jan. 30, 2019, which claims priority to Chinese Patent Application No. 201910020012.3, filed Jan. 9, 2019, titled "TUNING OPTOELECTRONIC TRANSCEIVERS IN OPTICAL NETWORK." All of the disclosures which are hereby incorporated herein by this reference in their entireties.

BACKGROUND

The present disclosure generally relates to signal transmission using optoelectronic devices.

In some circumstances, optoelectronic devices may be used in multiplexed networks to transmit signals or data. Multiplexing is a technique that enables multiple signals to be transmitted on the same transmission medium at the same time. Wavelength division multiplexing ("WDM") enables multiple optical signals to be transmitted over the same optical fiber. This is accomplished by having each signal have a different wavelength. On the transmission side, the various signals with different wavelengths are transmitted in the same optical fiber. At the receiving end of the transmission, the wavelengths are often separated. The advantage of WDM systems is that it effectively provides virtual fibers by making a single optical fiber carry multiple optical signals with different carrier wavelengths.

A dense wavelength division multiplexing ("DWDM") system may use carrier wavelengths where the separation between carrier wavelengths is less than a nanometer. In a DWDM system, more carrier wavelengths can be used to increase the capacity of the DWDM system. The wavelengths emitted by optoelectronic modules may be adjusted as needed based on the emitted wavelength and a target wavelength. The ability to adjust wavelengths may be useful in optical systems and in particular in DWDM systems.

Some optical networks may implement unidirectional optical system. Such systems are configured to transmit optical signals in one direction over a single, first optical cable and transmit signals in an opposite second direction over a second optical cable different from the first optical cable. Such systems may be considered "unidirectional" because each optical cable is used to transmit optical signals in only one direction. Unidirectional optical systems may implement duplex transceivers coupled to two optical fibers, one for transmitting data in a first direction and a second for transmitting data in an opposite second direction. In some circumstances, the two directions may be referred to as east and west directions. Other optical networks implement bidirectional systems, which employ one optical fiber for transmitting data in both directions (e.g., east and west). Bidirectional systems transmit signals in a first direction and an opposite second direction over the same optical cable.

The subject matter claimed herein is not limited to implementations that solve any disadvantages or that operate only in environments such as those described above. Rather, this background is only provided to illustrate one example technology area where some implementations described herein may be practiced.

SUMMARY

The present disclosure generally relates to signal transmission using optoelectronic devices.

In one example embodiment, a method of tuning optoelectronic transceivers in an optical network may include powering on a first optoelectronic transceiver, setting a channel wavelength of the first optoelectronic transceiver, transmitting a first request command from the first optoelectronic transceiver through the optical network to a second optoelectronic transceiver, and non-iteratively changing a channel wavelength of the first optoelectronic transceiver until a second request command is received from the second optoelectronic transceiver. The second request command may indicate to the first optoelectronic transceiver that the channel wavelength set by the first optoelectronic transceiver is able to travel through the optical network between the first optoelectronic transceiver and the second optoelectronic transceiver.

In some aspects, the non-iteratively changing the channel wavelength of the first optoelectronic transceiver may include randomly changing the channel wavelength of the first optoelectronic transceiver. The first request command may identify that the first optoelectronic transceiver is a master transceiver or a slave transceiver. The first request command or the second request command may be transmitted as out-of-band optical signals.

The method may include changing a channel wavelength of the first optoelectronic transceiver in response to a predetermined amount of time passing. Operating wavelengths of the optical network may be separated into wavelength pairs with a first wavelength for one direction and another wavelength for a second opposite direction, and the first optoelectronic transceiver may alternate between the wavelengths of the wavelength pairs.

The method may include transmitting an acknowledgement in response to the second request command being received from the second optoelectronic transceiver. Channel and/or wavelength information may be sent with the first request command. The first optoelectronic transceiver may be configured to send and receive predetermined types of messages, and the types of messages may include a message type for channel notification during scan and for channel detection acknowledgement.

In another example, a method tuning optoelectronic transceivers in an optical network may include powering on a first optoelectronic transceiver; receiving a first request command at the first optoelectronic transceiver; responding to the first request command; setting a channel wavelength of the first optoelectronic transceiver; transmitting a second request command including the set channel wavelength of the first optoelectronic transceiver from the first optoelectronic transceiver to a second optoelectronic transceiver; and waiting to receive an acknowledgement command from the second optoelectronic transceiver.

The first request command may identify that the first optoelectronic transceiver is a master transceiver or a slave transceiver. The method may include receiving a second acknowledgement from the second optoelectronic transceiver. The second acknowledgement may include confirmation that the second optoelectronic transceiver is set to operate at a channel wavelength as specified in the second request command. The method may include randomly or iteratively changing the channel wavelength of the first optoelectronic transceiver if the acknowledgement command is not received after a predetermined amount of time has passed, and transmitting a third request command including a changed channel wavelength.

The method may include randomly or iteratively changing a wavelength channel of the first optoelectronic transceiver until the acknowledgement command is received. The method may include beginning normal operation of the first optoelectronic transceiver at an operational wavelength channel in response to receiving the acknowledgement command from the second optoelectronic transceiver.

Responding to the first request command may include the first optoelectronic transceiver forwarding the first request command to the second optoelectronic transceiver if the request command is related to the second optoelectronic transceiver. The first request command may be received through the optical network from a network management system or another optoelectronic transceiver. The second request command may indicate that the second optoelectronic transceiver is to be set at a master or slave operating wavelength.

In yet another example a method of tuning optoelectronic transceivers in an optical network may include powering on a first optoelectronic transceiver; receiving a request command from a network management system or a second optoelectronic transceiver; setting the first optoelectronic transceiver to operate in a master or slave configuration based on the request command; and transmitting an acknowledgment to the network management system or the second optoelectronic transceiver in response to being able to operate at a channel wavelength specified in the request command. In some aspects, the request command may indicate whether the first optoelectronic transceiver is a master transceiver or a slave transceiver. The request command may be received from the second optoelectronic transceiver and may indicate that the first optoelectronic transceiver is the slave.

This Summary introduces a selection of concepts in a simplified form that are further described below in the Detailed Description. This Summary is not intended to identify key features or essential characteristics of the claimed subject matter, nor is it intended to be used as an aid in determining the scope of the claimed subject matter.

DETAILED DESCRIPTION

Figure 1:
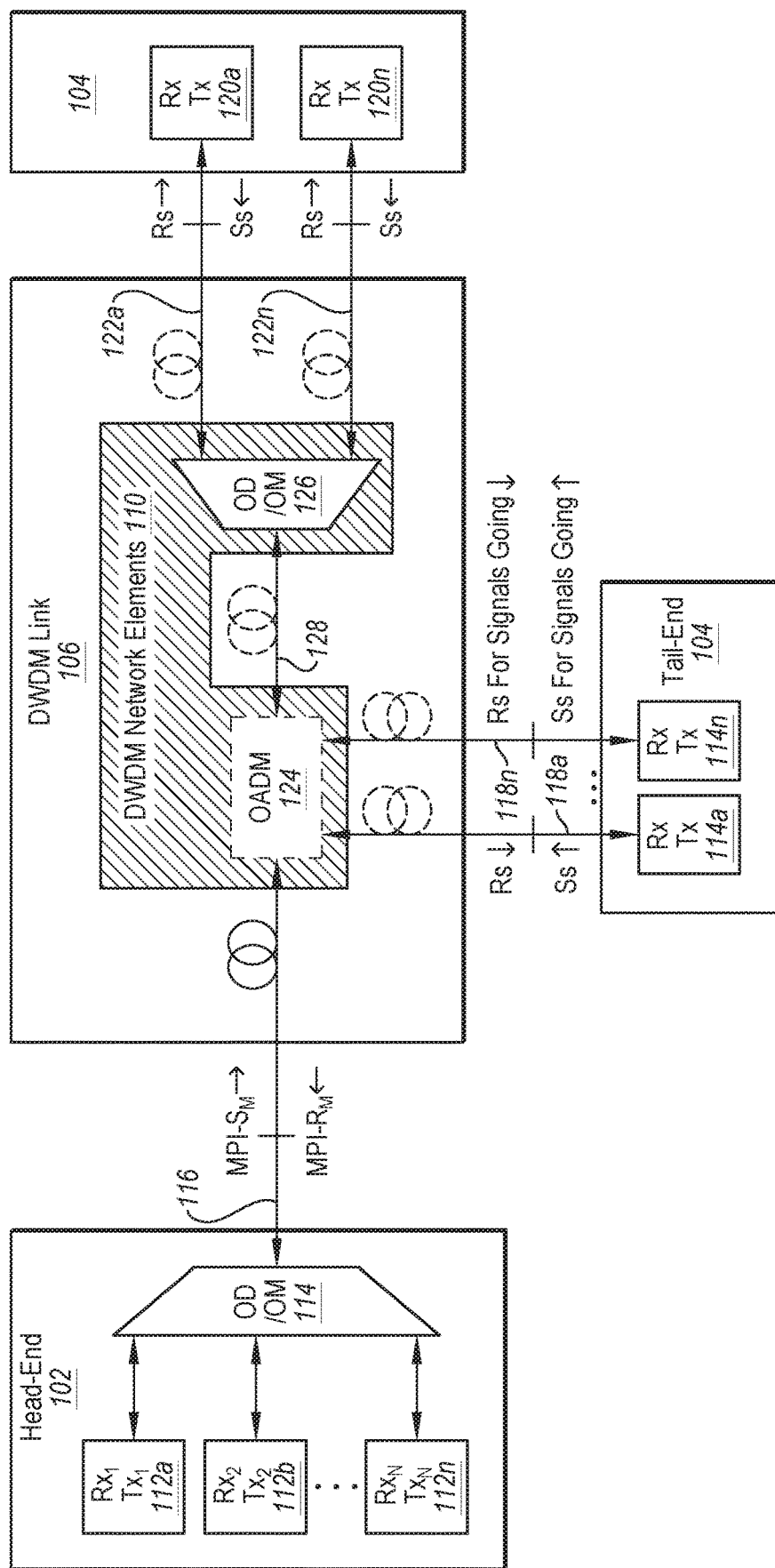
FIG. 1 is a schematic view of an example of a bidirectional system.

Reference will be made to the drawings and specific language will be used to describe various aspects of the disclosure. Using the drawings and description in this manner should not be construed as limiting its scope. Additional aspects may be apparent in light of the disclosure, including the claims, or may be learned by practice.

The present disclosure generally relates to signal transmission using optoelectronic modules. As used herein, the term "optoelectronic modules" includes modules having optical and electrical components. Examples of optoelectronic modules include, but are not limited to transponders, transceivers, transmitters, and/or receivers.

In particular, the present disclosure relates to optical wavelength tuning of optical transceivers wavelength division multiplexing ("WDM") or dense wavelength division multiplexing ("DWDM") systems. In some configurations, aspects of this disclosure may be implemented in bidirectional DWDM systems, although the concepts described herein may also be implemented in other systems.

The present disclosure includes wavelength band polling configurations that may be implemented with out-of-band communication signals to automatically tune the wavelength of bidirectional tunable transceivers in an optical network. Automatic tuning and selection of transceiver wavelength may facilitate optical transceivers being implemented in WDM or DWDM systems. In particular, the configurations described may decrease the steps needed to deploy optical transceivers in WDM or DWDM systems, because the transceiver does not have to be tuned by a user during or after installation.

Such configurations may be referred to as "plug and play," because of the limited steps required to complete installation after the transceiver is plugged in to interface with the system. In addition, the configurations described may be relatively low-cost, and may be implemented in transceivers without significantly increasing the cost of the transceiver or the systems implementing such transceivers.

In previous configurations of DWDM systems, wavelength tuning is generally performed manually, using a master transceiver and a slave transceiver. The wavelength of the master transceiver is selected by the network management system. The wavelength of the slave transceiver is tuned to match the wavelength of the pre-defined master transceiver, based on information sent from the master transceiver. In some configurations, the master transceiver may be included in head end equipment (HEE) of the system and the slave transceiver may be included in tail end equipment (TEE). In one example configuration, the HEE and TEE are defined in ITU-T G.698.4 (previously referred to as G.metro).

In some configurations, the disclosed concepts may be implemented in cellular networks. For example, the disclosed concepts may be implemented in C-RAN architectures for mobile network infrastructure including LTE-A and 5G wireless applications. In some configurations, the disclosed concepts may be implemented in ultra-dense WDM applications enabled by coherent detection and tunable transceiver functionality. For example, the disclosed concepts may be implemented for WDM standards such as G.698.4.

Colorless or fixed wavelength bidirectional transceivers may be well-suited RAN architectures for LTE-A and 5G wireless systems because DWDM systems provide higher bandwidth, while implementing colorless bidirectional transceivers may help reduce network deployment and maintenance costs.

The described automatic wavelength tuning configurations may facilitate in eliminating wavelength related installation and maintenance costs because the wavelength of the transceivers are automatically tuned. Thus, wavelength tuning may not be required during transceiver setup. Further, maintenance may not have to be performed with respect to the wavelength of the transceivers because the transceivers are automatically tuned the proper wavelength.

In addition, the described configurations permit the same transceiver to be used on both sides of bidirectional systems, which may decrease costs and simplify inventory because the same component (e.g., part number) may be used on both sides of the system. In contrast, in typical bidirectional system configurations, the transceivers on one side and the transceivers on the other side are generally sold as a matching pair, with the transceivers on each side including different configurations (and hence different part numbers). Such matching pairs may be acceptable for system vendors when the network includes a star architecture, for example, one head-end or hub site and multiple tail or remote sides, because it may be relatively easy to match the type of transceiver with the type of nodes, but it may cause additional maintenance cost if the network has a ring based architecture. The matching pairs of transceivers may need to be inserted at both ends of the link within a ring, since non-paired transceivers at two ends of the link may not be able to transmit optical signals properly, which may in turn add to maintenance costs due to the difficulties of pairing the transceivers at two ends of the link and match the node type or link direction with the type of transceiver. This matching difficulty may add to deployment costs of bi-directional transceivers in a ring based network, for example, in metro network applications.

The embodiments described may include optical interface specifications for transversely compatible bidirectional DWDM systems, which may be implemented in metro network applications. The tail end equipment (TEE) transmitters may have the capability to automatically adapt their DWDM channel frequency to the optical demultiplexer/optical multiplexer (OD/OM) or optical add/drop multiplexer (OADM) port they are connected to using feedback from the Head end Equipment (HEE) via the Head-to-Tail Message Channel (HTMC). In some configurations, the optical links for point-to-point DWDM applications may be single-mode optical fibers with both of the propagation directions sharing the same optical fiber end-to end. The link between the TEE and the HEE may be a passive link, and may not include optical amplifiers.

FIG. 1 is a schematic view of an example of a bidirectional system 100. The system 100 is one example of a system that may implement the concepts described herein. The system 100 includes head end equipment 102 and tail end equipment 104 optically coupled to a DWDM link 106. The head end equipment 102 includes transceivers 112a-112n optically coupled to an optical multiplexer or optical demultiplexer (OD/OM) 114. Each of the transceivers 112a-112n may include a corresponding transmitter TX and a corresponding receiver RX. The OD/OM 114 may combine the optical signals from the transmitters TX of the transceivers 112a-112n to be transmitted over an optical link 116. In addition, the OD/OM 114 may split optical signals received over the optical link 116 and direct corresponding signals to the receivers RX of the transceivers 112a-112n. In some configurations, the optical link 116 may be a single bidirectional optical fiber, although other configurations may be implemented.

The tail end 104 includes transceivers 114a-114n, each including a corresponding transmitter TX and a corresponding receiver RX. Each of the transceivers 114a-114n are optically coupled to the DWDM link 106 via a corresponding optical link 118a-118n to send and receive optical signals.

The system 100 also includes transceivers 120a-120n on the tail end 104, each including a corresponding transmitter TX and a corresponding receiver RX. Each of the transceivers 120a-120n are optically coupled to the DWDM link 106 via a corresponding optical links 122a-122n to send and receive optical signals. The optical links 122a-122n may be bidirectional. In some configurations, the transceivers 120a-120n may be part of a master side of the tail end 104.

The DWDM link 106 is optically coupled to the head end 102, the tail end 104, and the transceivers 120a-120n. The DWDM link 106 includes DWDM network elements 110 which may include an optical add-drop multiplexer (OADM) 124 and an OD/OM 126. In other configurations the OADM 124 may not be included in the DWDM link 106.

The OD/OM 126 may combine the optical signals from the transmitters TX of the transceivers 120a-120n to be transmitted over the optical link 128, which may be bidirectional. In addition, the OD/OM 126 may split optical signals received over an optical link 128 and direct corresponding signals to the receivers RX of the transceivers 120a-120n. The OADM 124 may be optically coupled to the OD/OM 126 an optical link 128, optically coupled to the head end 102 via the optical link 116, and optically coupled to the transceivers 114a-114n via the optical links 118a-118n. In some configurations, the optical links 118a-118n may be bidirectional optical fibers(s), although other configurations may be implemented.

The OADM 124 may act as a passive link between the transceivers 112a-112n of the head end 102 and the transceivers 114a-114n of the tail end 104. In particular, the OADM 124 may direct optical signals with specific wavelengths from the transceivers 112a-112n to corresponding transceivers of the transceivers 114a-114n, or vice versa.

In the illustrated configuration, the transceivers 112a-112n of the head end 102 may operate as master transceivers at a wavelength band A, and the transceivers 114a-114n of the tail end 104 may operate as slave transceivers at a wavelength band B, which is the pairing wavelength band that corresponds to wavelength band A. As used herein, a wavelength band may refer to a group of wavelengths or group of wavelength ranges.

The transceivers 114a-114n of the tail end 104 may have the capability to automatically adapt their DWDM channel frequency to a specific port of the OD/OM 126 or OADM 124. Such embodiments may permit the transceivers 112a-112n of the head end to communicate with the transceivers 114a-114n of the tail end 104 without having to exchange any additional information upon setup. Some embodiments may transmit data at rates of up to 10 gigabits per second (Gbit/s) with a channel frequency spacing of 50 gigahertz (GHz) and/or 100 GHz. Further, some embodiments may include transmission distances of up to 20 kilometers (km), with a capacity of up to 40 bidirectional channels.

Optical signals travelling through the optical link 116 from the head end 102 to the DWDM link 106 may be multichannel data signals transmitted by the transceivers 112a-112n of the head end 102. Optical signals travelling through the optical link 116 from the DWDM link 106 to the head end 102 may be multichannel data signals received by the transceivers 112a-112n of the head end 102.

Optical signals travelling through the optical links 118a-118n from the tail end 104 to the DWDM link 106 may be single channel data signals. Optical signals travelling through the optical links 118a-118n from the DWDM link 106 to the transceivers 114a-114n of the tail end 104 may be single channel data signals. At the $S_S$ interface, a single channel signal may be transmitted by one of the transceivers 114*a*-114*n* of the tail end 104 whose wavelength is appropriate to that of the connected OD/OM 126 or OADM 124 port.

For each optical channel, different ranges of frequencies are used in the head end to tail end directions and tail end to head end directions. The channel frequencies in the two directions may be paired so that their difference is equal to the minimum value compatible with the frequency ranges.

In one example, the optical channel frequencies may be paired according to Table 1 for a channel frequency spacing of 100 GHz:

TABLE 1

| HE-to-TE | TE-to-HE |
|---|---|
| 194.1 | 191.5 |
| 194.2 | 191.6 |
| ... | ... |
| 196 | 193.4 |

In another example, the optical channel frequencies may be paired according to Table 2 for a channel frequency spacing of 50 GHz:

TABLE 2

| HE-to-TE | TE-to-HE |
|---|---|
| 194.05 | 191.45 |
| 194.1 | 191.5 |
| ... | ... |
| 196 | 193.4 |

Figure 2:
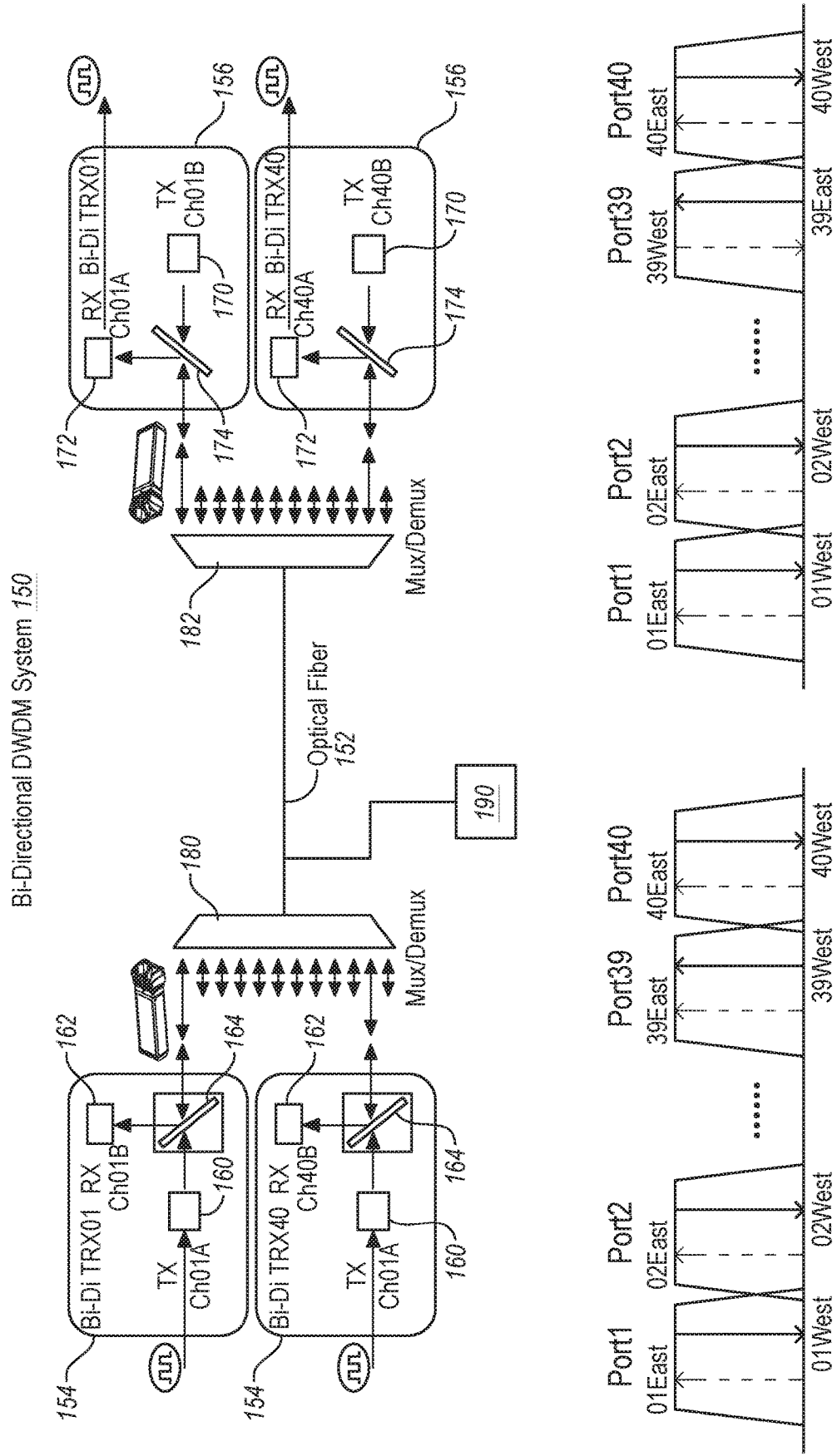
FIG. 2 is a schematic view of an example of a bidirectional dense wavelength division multiplexing system.

FIG. 2 is a schematic view of an example of a bidirectional dense wavelength division multiplexing ("DWDM") system 150. The system 150 includes multiple transceivers 154 on one side of an optical fiber 152, and multiple transceivers 156 on the other side of the optical fiber 152. Each of the transceivers 154 include a transmitter 160, a receiver 162, and a filter 164, and each of the transceivers 156 include a transmitter 170, a receiver 172, and a filter 174 configured to exchange optical signals via the optical fiber 152.

In some configurations, each of the channels of the system 150 have different wavelengths. In such configurations, each of the transceivers 154, 156 may be configured to transmit and receive optical signals with different wavelength of. In particular, each of the transceivers 154, 156 may be configured to transmit optical signals over a first wavelength or range of wavelengths and receive optical signals over a second wavelength or range of wavelengths, which is different than the first. In such configurations, each channel may operate on two different wavelengths, one wavelength for a first direction (e.g., east direction), and another wavelength for a second direction (e.g., west direction).

The system 150 also includes an optical multiplexer/demultiplexer (mux/demux) 180 on one side of the optical fiber 152 and a mux/demux 182 on the other side of the optical fiber 152. The mux/demux 180 receives the different optical signals (e.g., different channels) from the transmitters 160 of the transceivers 154 and combines the optical signals to be transmitted through the optical fiber 152. The mux/demux 182 receives the combined optical signals from the transceivers 154 and separates the optical signals to be received by the corresponding receivers 172 of the transceivers 156. Similarly, The mux/demux 182 receives the different optical signals (e.g., different channels) from the transmitters 170 of the transceivers 154 and combines the optical signals to be transmitted through the optical fiber 152. The mux/demux 180 receives the combined optical signals from the transceivers 156 and separates the optical signals to be received by the corresponding receivers 162 of the transceivers 154. In some configurations, the mux/demux 180 and the mux/demux 182 may be 100 gigahertz (GHz) mux/demux. Additionally or alternatively, the mux/demux 180 and the mux/demux 182 may include one or more thin-film filters, or an arrayed waveguide grating (AWG), such as a cyclic or common AWG.

As illustrated in FIG. 2, the system 150 communicates optical signals from the different optical transceivers 154, 156 over the optical fiber 152. The system 150 includes the optical mux/demux 180, 182 that directs optical signals between the different transceivers 154, 156. Although FIG. 2 illustrates four of the transceivers 154, 156 in detail, the system 150 may include any suitable number of transceivers, with each pair of transceivers corresponding to one channel of optical signals that may travel through the optical fiber. Furthermore, the illustrated system 150 may include any suitable number of channels, and each of the channels may be associated with a different wavelength or range of wavelengths of light.

The system 150 may be a bidirectional systems, meaning the system 150 is configured to transmit signals in a first direction and an opposite second direction over the same optical cable (i.e., the optical fiber 152). This is in contrast to unidirectional systems which include dedicated optical cables for signals in one direction, and another optical cable for signals in the opposite direction. Accordingly, the optical fiber 152 may be a bidirectional optical fiber. Furthermore, the system 150 may be a bidirectional dense wavelength division multiplexing system or a bidirectional colorless system, and the system 150 may be configured to transmit data signals and time synchronization signals in a first direction and an opposite second direction through the optical fiber 152.

The filter 164 may be configured to transmit wavelengths of optical signals from the transmitter 160 such that optical signals from the transmitter 160 travel to the mux/demux 180. Further, the filter 164 may be configured to reflect or otherwise direct wavelengths of optical signals from the mux/demux 180 to the receiver 162. Similarly, the filter 174 may be configured to transmit wavelengths of optical signals from the transmitter 170 such that optical signals from the transmitter 170 travel to the mux/demux 182. Further, the filters 174 may be configured to reflect or otherwise direct wavelengths of optical signals from the mux/demux 182 to the receiver 172. In some configurations, the filters 164, 174 may be a tunable filters, narrowband cyclic filters, period filters, edge filters, or other suitable filters.

The filters 164, 174 may be configured to transmit optical signals with a certain wavelength or range of wavelengths, and reflect optical signals with another wavelength or range of wavelengths. Furthermore, if the filters 164, 174 are tunable filters, this configuration may be changed so the optical transceivers 154, 156 may operate at different channels and on different sides of the optical fiber 152. In other configurations, mirrors or other suitable optical components may be implemented to direct optical signals instead of or in addition to the filters 164, 174.

In some configurations, the system 150 may include a wavelength locker, power detectors, and/or a network management system (NMS). For example, as illustrated, the system 150 may include an external wavelength locker, optical channel monitor (OCM) and/or power detector 190 as part of a NMS. The NMS may be implemented to send out the wavelength tuning and/or power tuning information to the transceivers in the optical network.

In some embodiments, the NMS may be coupled to the wavelength locker and the power detector 190 and may gather information from the wavelength locker and the power detector 190 to determine information regarding the optical network. This information may then be used to configure components in the optical network, for example, transceivers in the optical network. However, in other configurations, such as those described below, the NMS and the wavelength locker and the power detector 190 may be not be included.

Figure 3A:
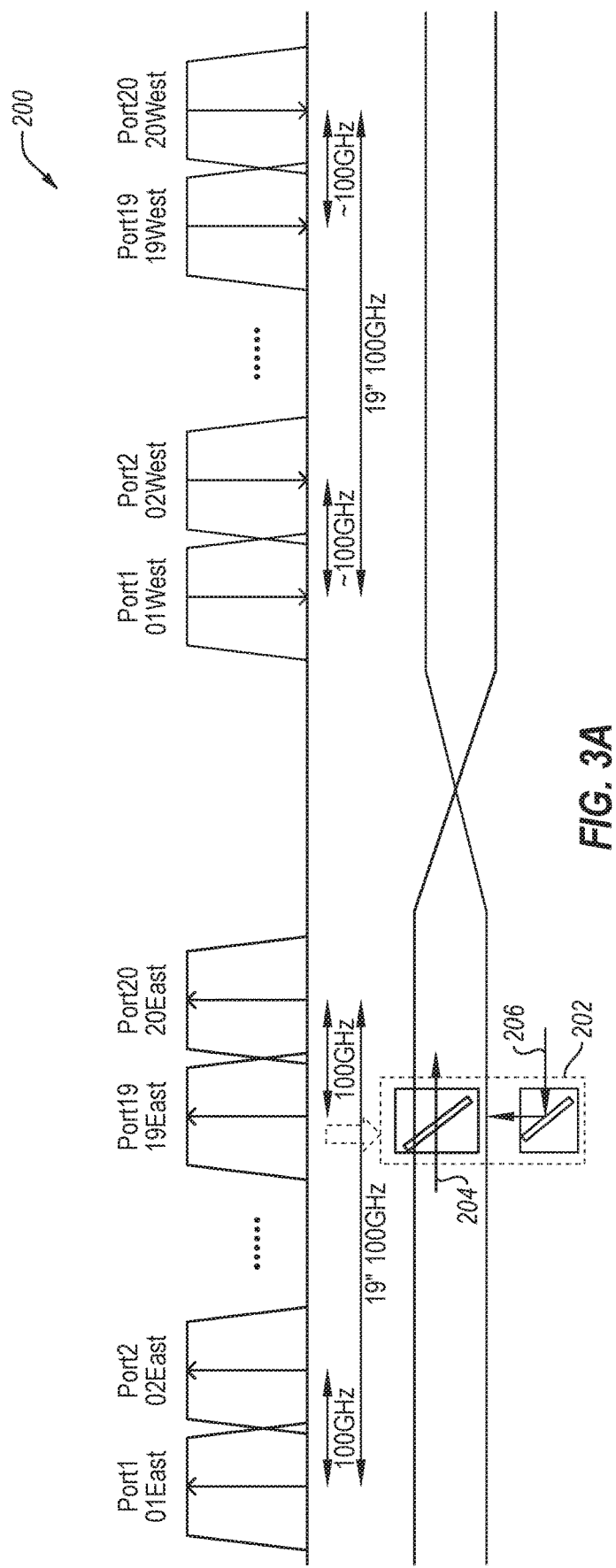
FIGS. 3A and 3B are schematic views of example configurations of a filter.
Figure 3B:
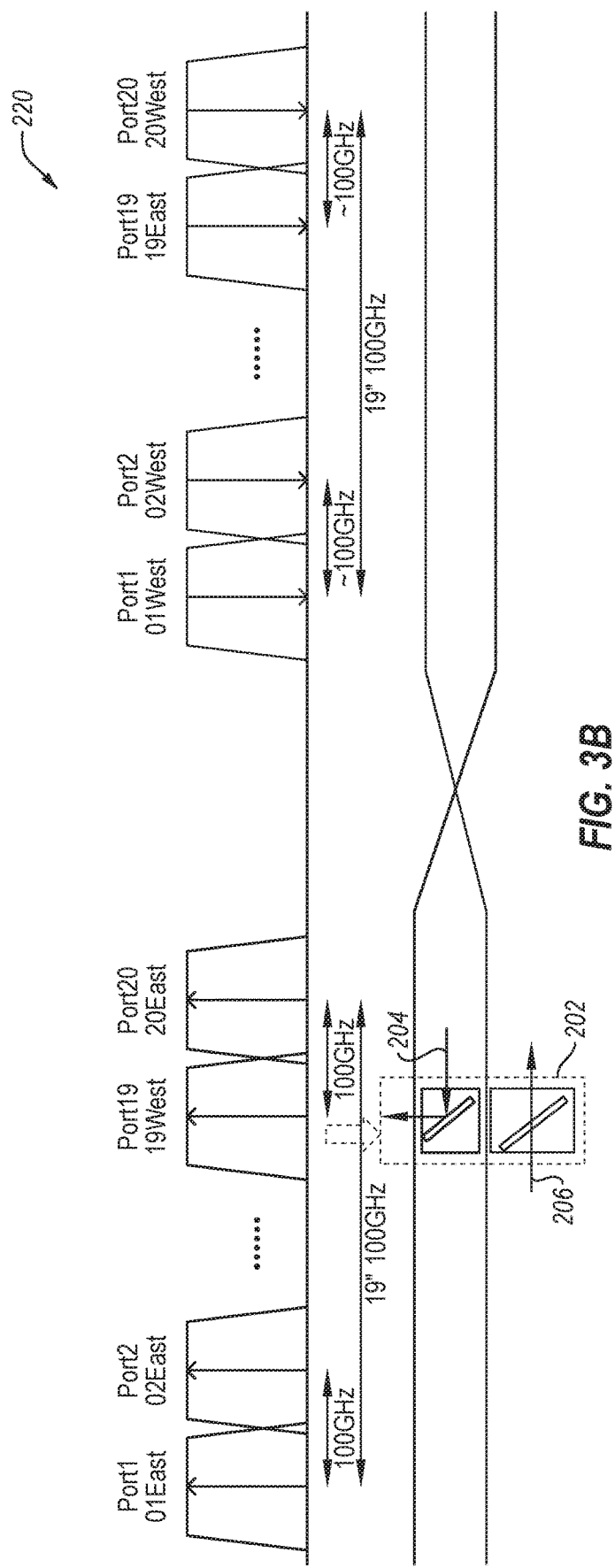

FIGS. 3A and 3B are schematic views of example configurations of a filter. In particular, FIG. 3A is a schematic view of a configuration 200, and FIG. 3B is a schematic view of a configuration 220. As shown in FIG. 3A, in configuration 200 a filter 202 transmits optical signals in a first range of wavelengths 204 and reflects optical signals in a second range of wavelengths 206. In such configurations, a transmitter may transmit optical signals in the first range of wavelengths 204, which travel through the filter 202 in a first direction (e.g., east bound). Further, the filter 202 receives optical signals that travel in a second direction opposite the first direction (e.g., west bound), reflects optical signals in the second range of wavelengths 206, which may be transmitted to a receiver. Thus, the filter 202 directs optical signals to the transmitter and the receiver based on wavelength.

As shown in FIG. 3B, in configuration 220 the filter 202 transmits optical signals in the second range of wavelengths 206 and reflects optical signals in the first range of wavelengths 204. In such configurations, the transmitter may transmit optical signals in the second range of wavelengths 206, which travel through the filter 202 in the first direction (e.g., east bound). Further, the filter 202 receives optical signals that travel in the second direction opposite the first direction (e.g., west bound), reflects optical signals in the first range of wavelengths 204, which may be transmitted to the receiver. Thus, the filter 202 directs optical signals to the transmitter and the receiver based on wavelength.

In some circumstances, the configuration 200 may be implemented on one side of a bidirectional DWDM system (see, for example, FIG. 2), and the configuration 220 may be implemented on the other side of a bidirectional DWDM system to send and receive one channel of optical signals over different wavelengths, depending on direction. Since the filter 202 may be a tunable filter, the same filter may be implemented on both sides of the bidirectional DWDM system, thus the transceiver and related hardware on both sides of the bidirectional DWDM system may be identical (e.g., only differing in the tuning configuration of the filter 202). Furthermore, the tuning of the filter 202 may be changed (e.g., tuned) to accommodate different wavelengths or channels used in the bidirectional DWDM system. In particular, the tuning of the filter 202 may be changed to reflect or transmit different wavelengths or ranges of wavelengths of optical signals, to direct different channels of optical signals. In some configurations, the filter 202 may be tuned by varying the temperature of the filter 202, although other suitable configurations and types of tunable filters may be implemented.

Figure 4:
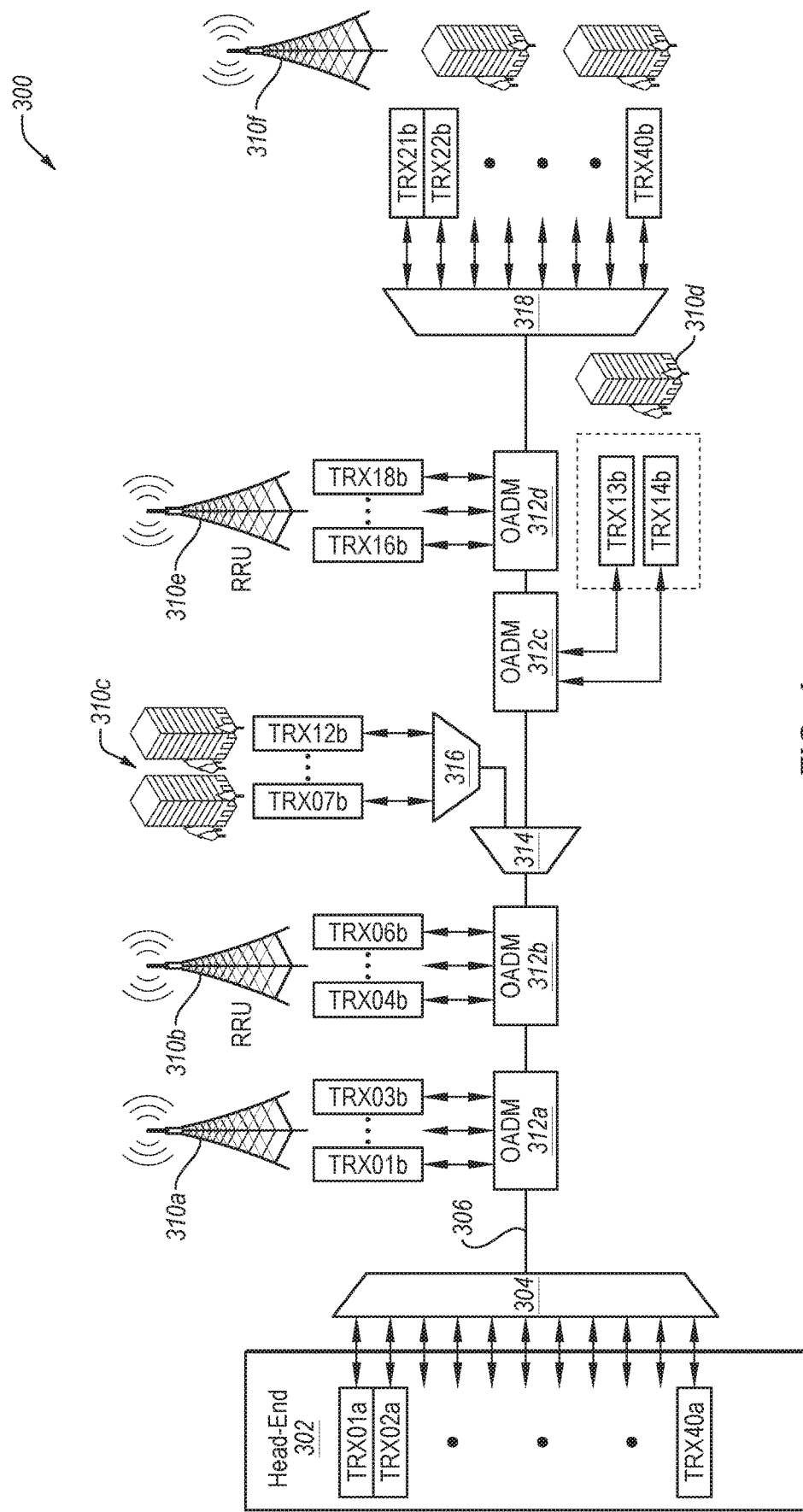
FIG. 4 is schematic view of an example of a multi-point system.

In some circumstances, the concepts described herein may be implemented in multi-point system with a bidirectional DWDM system. FIG. 4 is schematic view of an example of a multi-point system 300. The system 300 includes a head end 302 which may support 40 channels of optical signals 1-40 (or any other suitable number of optical channels), with corresponding transceivers TRX01a-TRX40a for each of the optical signal channels. The head end 302 is optically coupled to a mux/demux 304 that may multiplex and/or demultiplex optical signals traveling to or from the transceivers TRX01a-TRX40a. The mux/demux 304 may be optically coupled to a bidirectional optical fiber 306 that permits multiplexed optical signals to be transmitted to other portions of the system 300, for example, to tail ends 310a-f. The tail ends 310a-f may be optically coupled to other components of the system 300 via any suitable components such as OADMs or mux/demux.

For example, an OADM 312a is optically coupled to the tail end 310a to add/drop optical channels 1-3 via corresponding transceivers TRX01b-TRX03b. Similarly, an OADM 312b is optically coupled to the tail end 310b to add/drop optical channels 4-6 via corresponding transceivers TRX04b-TRX06b. A mux/demux 314 splits a portion of the remaining optical channels (e.g., optical channels 7-40) and directs optical channels 7-12 to the tail end 310c. A mux/demux 316 is optically coupled between the mux/demux 314 and the tail end 310c to direct optical channels 7-12 to corresponding transceivers TRX07b-TRX12b. An OADM 312c is optically coupled to the tail end 310d to add/drop optical channels 13-14 via corresponding transceivers TRX13b-TRX14b. An OADM 312d is optically coupled to the tail end 310e to add/drop optical channels 16-18 via corresponding transceivers TRX16b-TRX16b. A mux/demux 317 splits the remaining optical channels (e.g., optical channels 21-40) and directs optical channels 21-40 to the tail end 310f. In particular, the mux/demux 318 directs optical channels 21-40 to corresponding transceivers TRX21b-TRX40b.

As mentioned above, the disclosed embodiments relate to wavelength band polling configurations that may be implemented to automatically tune the wavelength of bidirectional tunable transceivers in an optical network. In some aspects, the wavelength band polling configurations may include out-of-band communication signals to tune the wavelength of transceivers. Automatic tuning and selection of transceiver wavelength may facilitate optical transceivers being implemented in WDM or DWDM systems.

Figure 5:
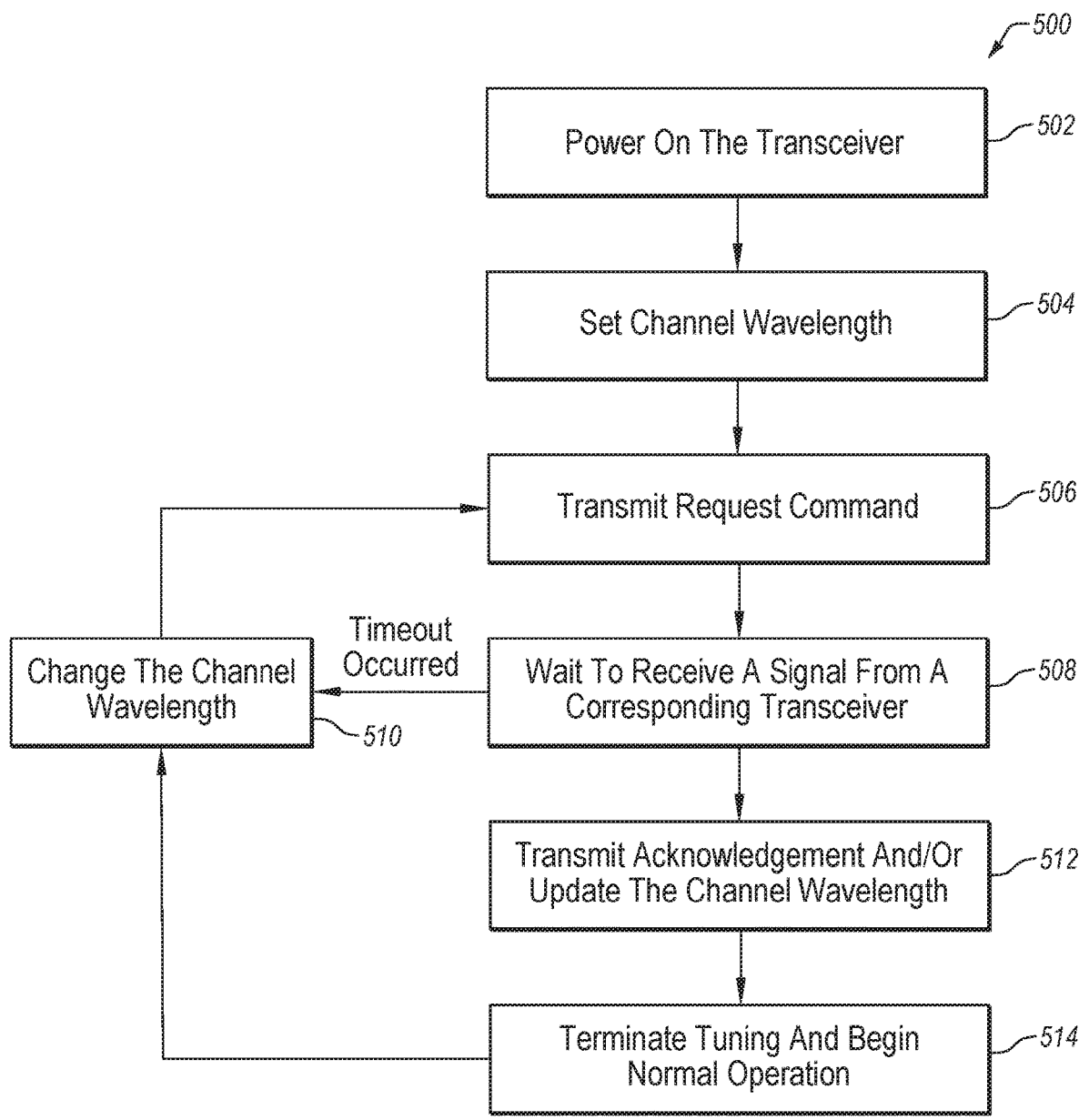
FIG. 5 is a flowchart of an example method of tuning a transceiver in an optical network.

FIG. 5 is a flowchart of an example method 500 of tuning a transceiver in an optical network. The method 500 may be implemented, for example, in the systems described above, such as the systems 100, 150 and/or 300 of FIGS. 1, 2, and 4 respectively. In some configurations, the method 500 may be performed by a transceiver that may be part of bidirectional DWDM system, such as the transceivers described above. Although illustrated as discrete blocks, various blocks may be divided into additional blocks, combined into fewer blocks, or eliminated, depending on the desired implementation.

The method 500 may begin at step 502, where the transceiver may be powered on. When the transceiver is powered on, it may not have information regarding the channel and wavelength it is supposed to operate on. The transceiver may need to be paired with another corresponding transceiver that is optically coupled via the optical network, but the specific channel that should be used may be unknown to the transceiver. Furthermore, the transceiver may not have information regarding whether it should operate in a master configuration or a slave configuration.

In some configurations, the operating wavelengths of the optical network may be separated into wavelength pairs, with a first wavelength for one direction (e.g., east direction) and another wavelength for the second opposite direction (e.g., west direction). For each transceiver, the first wavelength may correspond to the transmitter of the transceiver, and the second wavelength may correspond to the receiver, or vice versa if the transceiver is positioned on the other side of the optical network. In some aspects, the first wavelength may correspond to a master band and the second wavelength may correspond to a slave band, although other configurations may be implemented.

In configurations that implement wavelength pairs, the transceiver may not have information regarding which side of the optical network it is positioned on when it is powered on, and therefore it may also not have information regarding which specific wavelength of the wavelength pairs should be used (e.g., the wavelength for the east direction for a given channel, or the wavelength for the west direction for the channel).

Accordingly, after startup the transceiver may begin scanning to identify which channel and/or which wavelength it should operate on. Although as described the method 500 is performed by a transceiver located on one side of the optical network, it should be appreciated that the method 500 may also be performed by the corresponding transceiver on the other side of the optical network. In addition, each of the transceivers that are part of the optical network may perform the method 500 to identify which channel and/or which wavelength it should operate on.

At step 504, the transceiver may set its channel wavelength. In some configurations, the channel wavelength may be set to a random value, and the random value may be selected from a list of possible wavelength channels compatible with the transceiver. In other configurations, the transceiver may set its channel wavelength to a predefined value determined before the transceiver is powered on.

At step 506, the transceiver may transmit a request command. In some configurations, the request command may include the channel wavelength of the transceiver and/or the request command (e.g., the set channel wavelength from step 504), which may be a random value selected from a list of possible wavelength channels. In other configurations, the request command may not include the channel wavelength of the transceiver.

The request command may be transmitted as an optical signal from a transmitter of the transceiver. The request command may travel from the transceiver and through an optical network, such as bidirectional DWDM system, to a corresponding transceiver that receives the request command. In particular, the request command may be received at a receiver of the corresponding transceiver. In some configurations, the request command may include channel setup information or other aspects related to the optical network.

In some embodiments, the request command may be transmitted as an out-of-band optical signal. In some circumstances, optical signals exchanged by a transceiver (or a corresponding pair of transceivers) may include in-band optical signals and out-of-band (OOB) optical signals. In-band optical signals may generally be used to transmit high speed data, and may include electronic files or programs transmitted over a computer network, command and status signals transmitted between two buildings of a campus or servers in a server farm, or the transmission of various files. In contrast, OOB optical signals may include data related to the management and status of the optical network, the optical signal and/or the optical channel that carries the optical signal. For example, the OOB optical signals may include data indicating an intensity of the optical signal, a command to reduce intensity of the optical signal, and/or a command to increase the intensity of an optical signal, and/or transceiver memory map information.

The OOB optical signals may be transmitted in a different manner than the in-band optical signals. For example, the OOB optical signals may be frequency or amplitude modulated and transmitted along with the in-band optical signals without disrupting or interfering with the in-band optical signals. In some circumstances, in-band optical signals may be relatively high speed data signals and the OOB optical signals may be relatively low speed data signals (or at least lower speed than the in-band optical signals).

At step 508, the transceiver may wait to receive an optical signal, such as a second request command from the corresponding transceiver. As explained above, in some embodiments the transceivers on both sides of the system may be substantially the same. And in some embodiments the corresponding transceiver on the other side of the system may perform the method 500 of tuning a transceiver in the optical network. In such configurations, the corresponding transceiver on the other side of the system may transmit an optical signal and/or a request command (e.g., the second request command) with the channel wavelength of the corresponding transceiver, as described with respect to step 504. Thus, the second request command from the corresponding transceiver may travel through the system to the transceiver, which may receive the second request command. Additionally or alternatively, step 508 may include receiving the optical signal or receiving the second request command from the corresponding transceiver as an optical signal and/or through the optical network. In some configurations, the second request command may be received as an out-of-band optical signal.

The received second request command may indicate to the transceiver that this specific wavelength may travel through the optical system, for example, between the transceiver and the corresponding transceiver on the other side of the optical system. As mentioned above, in some circumstances the second request command may include wavelength information. In such circumstances, the transceiver may determine the wavelength of optical signals that may pass between the two transceivers.

If the second request command is not received after a certain amount of time has passed, the transceiver may proceed to step 510, in which the transceiver changes the channel wavelength. In some configurations, the transceiver may wait a predetermined amount of time before proceeding to step 510. In some circumstances the amount of time that the transceiver waits may be a timeout length of time, and this length of time may be adjustable or configurable. In some embodiments, the transceiver may be configured to increase the channel wavelength by one iteration (e.g., one wavelength range). The method 500 may then return to step 506 in which the transceiver may transmit a request command with the new channel wavelength. The method 500 may continue by iteratively increasing the wavelength channel by one iteration until the second request command is received, or until a maximum wavelength channel is reached. If the maximum wavelength channel is reached, the transceiver may change the channel wavelength to the lowest channel wavelength, and the iterative increase of the channel wavelength may continue until the second request command is received. In this manner, the transceiver may scan all of the possible wavelength channels until a suitable channel is identified.

Although in one example embodiment, the channel wavelength iteratively increases until the second request command is received, in other configurations an appropriate wavelength may be identified in other manners. For example, the channel wavelength may be changed at random, rather than increasing. In such configurations, the channel wavelength may be varied with or without repeating previous channel wavelengths, until a message is received from the corresponding transceiver.

If the operating wavelengths of the optical network are separated into wavelength pairs with a first wavelength for one direction and another wavelength for the second opposite direction, then the transceiver may alternate between the wavelengths of the wavelength pairs. Additionally or alternatively, the transceiver may receive alternated wavelength pairs from the corresponding transceiver. The transceivers may use the alternated wavelength pairs to determine which side of the optical network they are located on.

If the second request command is received, the method 500 may proceed to step 512, in which the transceiver may transmit an acknowledgement, for example, through the optical network to the corresponding transceiver and/or update its channel wavelength based on the received second request command. In some configurations, the second request command received from the corresponding transceiver may include a channel wavelength of the corresponding transceiver. In such configurations, the transceiver may update its channel wavelength based on the channel wavelength of the corresponding transceiver, if necessary. The transceiver may transmit an acknowledgement whether or not the second request command includes the channel wavelength of the corresponding transceiver. In some configuration, the acknowledgement may be transmitted as an OOB optical signal. Additionally or alternatively, the acknowledgement may include local channel information.

As mentioned, the operating wavelengths of the optical network may be separated into wavelength pairs with a first wavelength for one direction and another wavelength for the second opposite direction. In such configurations, the transceiver may receive the second request command and determine its wavelength, and then the transceiver may switch to transmitting to the other wavelength in the corresponding wavelength pair.

Once the channel pairing is confirmed by both the transceiver and the corresponding transceiver on the other side of the network, one or both of the transceivers may switch to channel pairing mode.

At step 514, the transceiver and/or the corresponding transceiver may terminate tuning and/or may begin normal transceiver operation. Normal transceiver operation may include transmitting and/or exchanging data signals with the corresponding transceiver through the optical network. In some configurations, the exchanged data signals may be in-bound optical signals.

In some configurations, step 514 may be considered a normal operating state of the transceiver. Additionally or alternatively, steps 504-510 may be considered tuning steps or a discovery state of the transceiver. Step 502 may be considered a startup state of the transceiver, or may be included in the tuning steps or the discovery state.

If the transceiver ceases to receive data signals from the corresponding transceiver, or if the transceiver otherwise detects improper or suboptimal operation, the method 500 may proceed back to step 510, and the transceiver may initiate the tuning steps or the discovery state of the transceiver.

As mentioned above, the transceiver may scan to identify which channel and/or which wavelength it should operate on. In some configurations, the channel and/or the wavelength may be sent along with the request command, and the request command (with the channel and/or the wavelength) may be sent as OOB optical signals, as described with respect to step 506. In other configurations, the request command may not include the channel and/or the wavelength information, and in such configurations the request command may not be sent as OOB optical signals. In some circumstances, scanning with the channel and/or the wavelength information may be faster than scanning without the channel and/or the wavelength because the corresponding site can use the received channel information to decide local channel wavelength and skip a potentially unnecessary scan of local wavelength to save scanning time. In particular, skipping a scan of local wavelength to save scanning time may be implemented in configurations where the wavelength of both directions of the optical network (e.g., east and west directions) are set in pair, and the specific links in both directions are designed to be transparent to this pair of wavelengths for the specific port based on the design of passive components for di-directional system to facilitate bi-directional optical transmission. In other words, when scanning with the channel and/or the wavelength information, only one successful try may be necessary to get the required channel information in any direction, which will in turn save scanning time.

In one example configuration, a transceiver may be powered up without wavelength and band information. The transceiver may separate the all wavelengths into two bands (for example, band A as a master band, and band B as a slave band). In one aspect, for pair of bidirectional transceivers, band A may be for a transmit direction and band B may be for a receiving direction, or vice versa. One transceiver of a pair of transceivers may begin a full channel fast scan (e.g., without transmitting channel and/or wavelength information via OOB optical signals) with band A and band B alternated. The transceiver may lock the current band as a target band once it receives optical power from the corresponding transceiver on the other side of the optical network, and the transceiver may send a full channel fast scan of target band. When the corresponding transceiver receives optical power from first transceiver, it may lock current band as a target band, and send a full channel fast scan of target band.

In some aspects, the transceiver operating on band A may be a master transceiver and the transceiver operating on band B may be a slave transceiver. The master transceiver may begin a full channel slow scan in the target band, and the current channel number may be transmitted via OOB optical signals (e.g., to the corresponding transceiver). The slave transceiver may receive the transmitted OOB optical signals and may lock the target channel and send and acknowledgement to the master transceiver once it receives the target channel information via the OOB optical signals. The slave transceiver may then begin operating on the target channel. The master transceiver may receive the acknowledgement from the slave transceiver and may stop the full channel slow scan and lock the current channel as the target channel once it receives the acknowledgement from the slave transceiver. The master transceiver may then begin operating on the target channel. Once the channel pairing is confirmed, the slave and the master transceivers may switch to channel pairing mode.

In configurations where an external wavelength locker, optical channel monitor and/or power detectors are not used, the pair of transceivers may poll the master and slave if necessary, as described above. However, in other configurations a wavelength locker and a power detector may be implemented. Furthermore, in some configurations a network management system (NMS) may be implemented, and may send out the wavelength tuning and/or power tuning information to the transceivers in the optical network. In some embodiments, the NMS may be coupled to the wavelength locker and the power detector and may gather information from the wavelength locker and the power detector to determine information regarding the optical network. This information may then be used to configure components in the optical network, for example, transceivers in the optical network.

In some configurations, the NMS may determine which transceivers in an optical network are master transceivers or slave transceivers, and/or may determine which end of an optical network the transceivers are positioned on. The NMS may then use this information to configure the transceivers according to whether they are master transceivers or slave transceivers and/or based on their position in an optical network.

Figure 6:
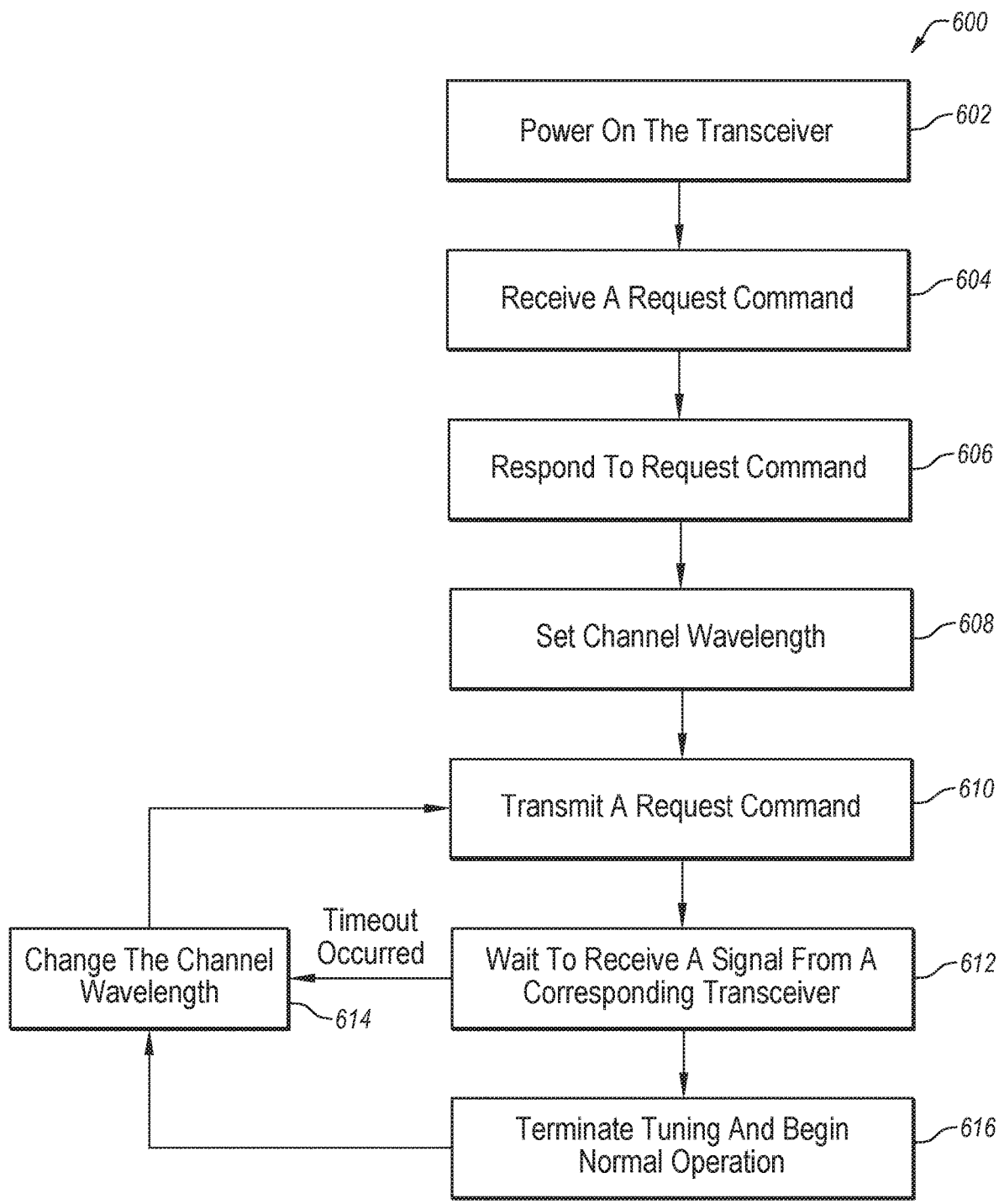
FIG. 6 is a flowchart of an example method of tuning a transceiver in an optical network that includes a Network Management System (—NMS).

FIG. 6 is a flowchart of an example method 600 of tuning a transceiver in an optical network that includes a Network Management System (NMS). The method 600 may be implemented, for example, in the systems described above, such as the systems 100, 150 and/or 300 of FIGS. 1, 2, and 4 respectively. In some configurations, the method 600 may be performed by a transceiver that may be part of bidirectional DWDM system, such as the transceivers described above. Although illustrated as discrete blocks, various blocks may be divided into additional blocks, combined into fewer blocks, or eliminated, depending on the desired implementation.

The method 600 may begin at step 602, where the transceiver may be powered on. When the transceiver is powered on, it may not have information regarding the channel and wavelength it is supposed to operate on. The transceiver may need to be paired with another corresponding transceiver that is optically coupled via the optical network, but the specific channel that should be used may be unknown to the transceiver. Furthermore, the transceiver may not have information regarding whether it should operate in a master configuration or a slave configuration, or its position in the optical network (e.g., which side of the optical network it is positioned on). In some configurations, the transceiver may default to operate in a slave configuration unless it receives a request command indicating otherwise, although other configuration may be implemented.

In some configurations, the NMS may identify which transceivers are on which side of the optical network. For example, for two corresponding transceivers, the NMS may identify that one of the transceivers is on one side of an optical network, and the other transceiver is on the other side of the optical network. Additionally or alternatively, the NMS may identify one of the transceivers as a master transceiver, and the other transceiver as the slave transceiver. Further, the NMS may transmit a request command to one or both of the transceivers of a pair of transceivers. The request command may include wavelength tuning and/or power tuning information. In some embodiments, the request command may identify that the transceiver is the master transceiver or the slave transceiver. In some configuration, the request command may be transmitted as an OOB optical signal.

At step 604, the request command may be received at the transceiver, for example, from the NMS or the corresponding transceiver on the other side of the optical network.

At step 606, the transceiver may respond to the request command of the NMS. For example, the transceiver may respond to the tuning request with an acknowledgment or confirmation if the transceiver may operate at the wavelength the NMS requests, or the transceiver may forward the request command to a remote pairing transceiver if the request is related to the remote pairing transceiver. For example, if the transceiver is identified as a master transceiver, it may forward a request command intended for the slave transceiver to the corresponding slave transceiver, or vice versa. Responding to the request command may include the transceiver setting itself to the master configuration or the slave configuration, depending on the content of the request command received from the NMS.

Since the transceiver receives information regarding its operating state (e.g., master or slave) from the NMS. It may not need to determine whether it is the master or the slave transceiver and/or which side of the optical network it is positioned on. In configurations where the operating wavelengths of the optical network are separated into wavelength pairs, the transceiver may have information which direction it transmits optical signals (e.g., east direction or west direction), but it may not have information regarding which specific wavelength should be used. Accordingly, after identifying whether it is the master or the slave, the transceiver may begin scanning to identify which channel and/or which wavelength it should operate on.

Since the transceiver has information regarding which direction it transmits optical signals (e.g., east direction or west direction), it may not need to scan half of the possible optical wavelengths. For example, if the transceiver has received information from the NMS that it is a master transceiver and/or that it transmits signals in the east direction, the transceiver may only need to scan wavelengths corresponding to the east direction, not the any of the wavelengths corresponding to the west direction. Such configurations may result in relatively quicker scanning, but may require additional components such as an NMS, an external wavelength locker and/or a power detector.

Although as described the method 600 is performed by a transceiver located on one side of the optical network, it should be appreciated that the method 600 may also be performed by the corresponding transceiver on the other side of the optical network. In addition, each of the transceivers that are part of the optical network may perform the method 600 to identify which channel and/or which wavelength it should operate on.

At step 608, the transceiver may set its channel wavelength. In some configurations, the channel wavelength may be set to a random value, and the random value may be selected from a list of possible wavelength channels compatible with the transceiver, and corresponding to a band designated for one of the directions in the optical network (e.g., east direction or west direction).

At step 610, the transceiver may transmit a request command. The request command may include the channel wavelength of the transceiver and/or the request command (e.g., the set channel wavelength from step 608), which may be a random value selected from a list of possible wavelength channels. The request command may be transmitted as an optical signal from a transmitter of the transceiver. The request command may travel from the transceiver and through the optical network to the corresponding transceiver that receives the request command. In particular, the request command may be received at a receiver of the corresponding transceiver. In some configurations, the request command may include channel setup information or other aspects related to the optical network. In some embodiments, the request command may be transmitted as an out-of-band optical signal.

In some circumstances, the corresponding transceiver that receives the request command may be the slave transceiver. In response to receiving the request command, the corresponding transceiver may set itself to the appropriate operating wavelength, for example, based on the information received in the request command. Additionally or alternatively, the corresponding transceiver may transmit and acknowledgement command through the optical network, to the transceiver that sent the request command. In some configurations, the acknowledgement command may be sent as an out-of-band optical signal.

At step 612, the transceiver may wait to receive an optical signal, such as the acknowledgement command from the corresponding transceiver. The received acknowledgement command may indicate to the transceiver that this specific wavelength may through travel the optical system, for example, between the transceiver and the corresponding transceiver on the other side of the optical system. In some circumstances the acknowledgement command may include wavelength information. In such circumstances, the transceiver may determine the wavelength of optical signals that may pass between the two transceivers based on the acknowledgement command.

If the acknowledgement command is not received after a certain amount of time has passed, the transceiver may proceed to step 614, in which the transceiver changes the channel wavelength. In some configurations, the transceiver may wait a predetermined amount of time before proceeding to step 614. In some circumstances the amount of time that the transceiver waits may be a timeout length of time, and this length of time may be adjustable or configurable. In some embodiments, the transceiver may be configured to increase the channel wavelength by one iteration (e.g., one wavelength range). The method 600 may then return to step 610 in which the transceiver may transmit a request command with the new channel wavelength.

The method 600 may continue by iteratively increasing the wavelength channel by one iteration until the acknowledgement command is received, or until a maximum wavelength channel is reached. If the maximum wavelength channel is reached, the transceiver may change the channel wavelength to the lowest channel wavelength, and the iterative increase of the channel wavelength may continue until the second request command is received. In this manner, the transceiver may scan all of the possible wavelength channels until a suitable channel is identified. However, as mentioned above, since the transceiver has information regarding whether it is a master or slave transceiver and/or regarding its position in the wireless network, the number of wavelength channels scanned may be decreased when compared to method 500.

Once the channel pairing is confirmed by both the transceiver and the corresponding transceiver on the other side of the network, one or both of the transceivers may switch to channel pairing mode.

At step 616, the transceiver and/or the corresponding transceiver may terminate tuning and/or may begin normal transceiver operation. The transceiver may terminate tuning and/or may begin normal transceiver operation in response to receiving the acknowledgement command from the other transceiver. Normal transceiver operation may include transmitting and/or exchanging data signals with the corresponding transceiver through the optical network. In some configurations, the exchanged data signals may be in-bound optical signals.

In some configurations, step 616 may be considered a normal operating state of the transceiver. Additionally or alternatively, steps 604-612 may be considered tuning steps or a discovery state of the transceiver. Step 602 may be considered a startup state of the transceiver, or may be included in the tuning steps or the discovery state.

If the transceiver ceases to receive data signals from the corresponding transceiver, or if the transceiver otherwise detects improper or suboptimal operation, the method 600 may proceed back to step 614, and the transceiver may initiate the tuning steps or the discovery state of the transceiver.

As described above, in some configurations a wavelength locker, a power detector, and an NMS may be used to determine information regarding the optical network. This information may then be used to configure the transceivers, for example, as master or slave transceivers. Additionally or alternatively, in some configurations the NMS may gather information from the wavelength locker and the power detector to determine which channel wavelength transceivers in the optical network should operate on.

Figure 7:
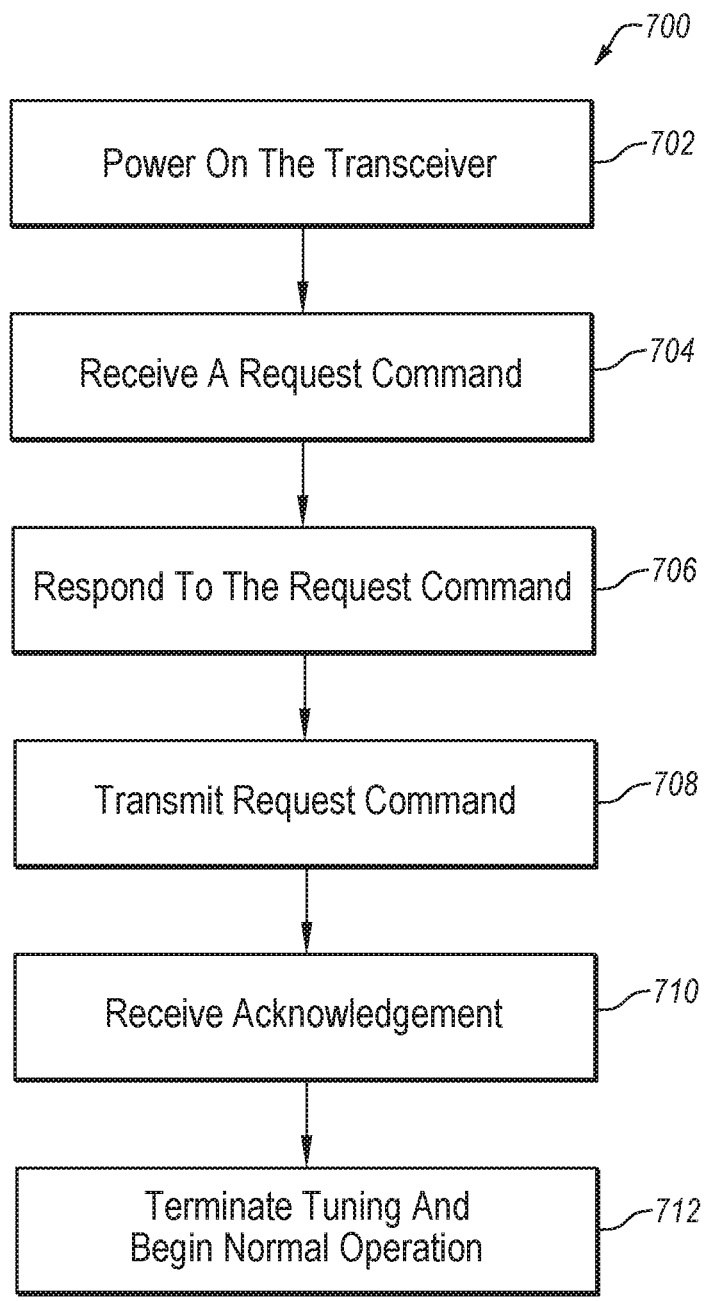
FIG. 7 is a flowchart of another example method of tuning a transceiver in an optical network that includes a Network Management System (NMS).

FIG. 7 is a flowchart of an example method 700 of tuning a transceiver in an optical network that includes a Network Management System (NMS). The method 700 may be implemented, for example, in the systems described above, such as the systems 100, 150 and/or 300 of FIGS. 1, 2, and 4 respectively. In some configurations, the method 700 may be performed by a transceiver that may be part of bidirectional DWDM system, such as the transceivers described above. Although illustrated as discrete blocks, various blocks may be divided into additional blocks, combined into fewer blocks, or eliminated, depending on the desired implementation.

The method 700 may begin at step 702, where the transceiver may be powered on. When the transceiver is powered on, it may not have information regarding the channel and wavelength it is supposed to operate on. The transceiver may need to be paired with another corresponding transceiver that is optically coupled via the optical network, but the specific channel that should be used may be unknown to the transceiver. Furthermore, the transceiver may not have information regarding whether it should operate in a master configuration or a slave configuration, or its position in the optical network (e.g., which side of the optical network it is positioned on). In some configurations, the transceiver may default to operate in a slave configuration unless it receives a request command indicating otherwise, although other configuration may be implemented.

As described above, in some configurations the NMS may identify which transceivers are on which side of the optical network and/or may identify which transceivers should be set as master transceivers or slave transceivers. Additionally or alternatively, the NMS may identify which channel wavelength transceivers in the optical network should operate on. The NMS may transmit a request command to one or both of the transceivers of a pair of transceivers. The request command may include wavelength tuning and/or power tuning information, including the specific wavelength the transceiver should operate on. In some configuration, the request command may be transmitted as an 00B optical signal.

At step 704, the request command may be received at the transceiver, for example, from the NMS or the corresponding transceiver on the other side of the optical network.

At step 706, the transceiver may respond to the request command of the NMS. For example, the transceiver may respond to the tuning request with an acknowledgment or confirmation if the transceiver may operate at the wavelength the NMS requests. Responding to the request command may include the transceiver setting itself to the master configuration or the slave configuration, depending on the content of the request command received from the NMS. Additionally or alternatively, responding to the request command may include the transceiver setting itself to the correct operating wavelength channel based on the content of the request command received from the NMS.

Since the transceiver receives information regarding its operating state (e.g., master or slave) which direction it transmits optical signals (e.g., east direction or west direction), and which wavelength it should operate in from the NMS, it may not require scanning to determine which wavelength it should operate on.

After the transceiver sets itself to the proper operating channel, the transceiver may proceed in tuning the corresponding transceiver to the proper wavelength channel. For example, if the transceiver is identified as a master transceiver, it may transmit a second request command to the corresponding slave transceiver.

Accordingly, at step 708, the transceiver may transmit a second request command to the corresponding slave transceiver. The second request command may include wavelength tuning and/or power tuning information. For example, the second request command may include identify that the corresponding transceiver is the slave transceiver. Additionally or alternatively, the second request command may include the specific wavelength the transceiver should operate on. In some configuration, the second request command may be transmitted as an 00B optical signal.

The corresponding transceiver may respond to the tuning request with an acknowledgment or confirmation. In particular, the corresponding transceiver may respond to the tuning request if it may operate at the channel wavelength as specified in the second request. Additionally or alternatively, the corresponding transceiver may set itself to operate on the channel wavelength as specified in the second request.

At step 710, the transceiver may receive the acknowledgement from the corresponding transceiver. The acknowledgement may include a confirmation that the corresponding transceiver is set to operate at the channel wavelength as specified in the second request.

Once the channel pairing is confirmed by both the transceiver and the corresponding transceiver on the other side of the network, one or both of the transceivers may switch to channel pairing mode.

At step 712, the transceiver and/or the corresponding transceiver may terminate tuning and/or may begin normal transceiver operation. Normal transceiver operation may include transmitting and/or exchanging data signals with the corresponding transceiver through the optical network. In some configurations, the exchanged data signals may be in-bound optical signals.

In some configurations, transceivers may be configured to send or receive specific types of messages (TOM). Such TOM's may be specified for example, in specifications for physical layer interfaces of DWDM systems. Such specifications may be standardized by industry groups. In some circumstances, additional TOM's may be implemented to apply the configurations as described above. For example, a discovery type TOM may be used to indicate discovery of a remote transceiver. In another example, a channel notification during scan TOM may be used to indicate a local channel notification when wavelength and band information has not been defined (for example, as corresponding to method 500). In yet another example, a channel detection acknowledgement TOM may be used to indicate acknowledgement with local channel information based on the channel information it receives or acknowledgement that shows that it has received signal. In other aspects, other TOM's may be implemented to realize the configurations described herein.

In some configurations, the behavior of the TEE may be defined as a state machine operating on the values of the TOM field in Head-to-Tail Message Channel (HTMC). The state machine may include states such as: TEE transmitter switched off in standby mode; TEE transmitter switched off but ready to start the tuning procedure; TEE transmitter sweeping frequency, transmitting at the required tuning power and sending the pilot tone at the tuning modulation depth; TEE transmitter transmitting within required channel, sending the pilot tone at the operational modulation depth and adjusting output power and frequency; TEE transmitting at the required power and central frequency, sending the pilot tone at the operational modulation depth and sending traffic (i.e. regular operation). TEE transmitting at the required power and central frequency, sending the THMC and sending traffic (i.e. regular operation). In addition, to implement the configurations as described above, the state machine may include an additional state to indicate that channel pairing is complete, which may correspond to the channel detection acknowledgement TOM that may be used to indicate acknowledgement with local channel information based on the channel information it receives or acknowledgement that shows that it has received signal. However, other configurations may also be implemented. In other aspects, other state machines may be implemented to realize the configurations described herein.

Figure 8A:
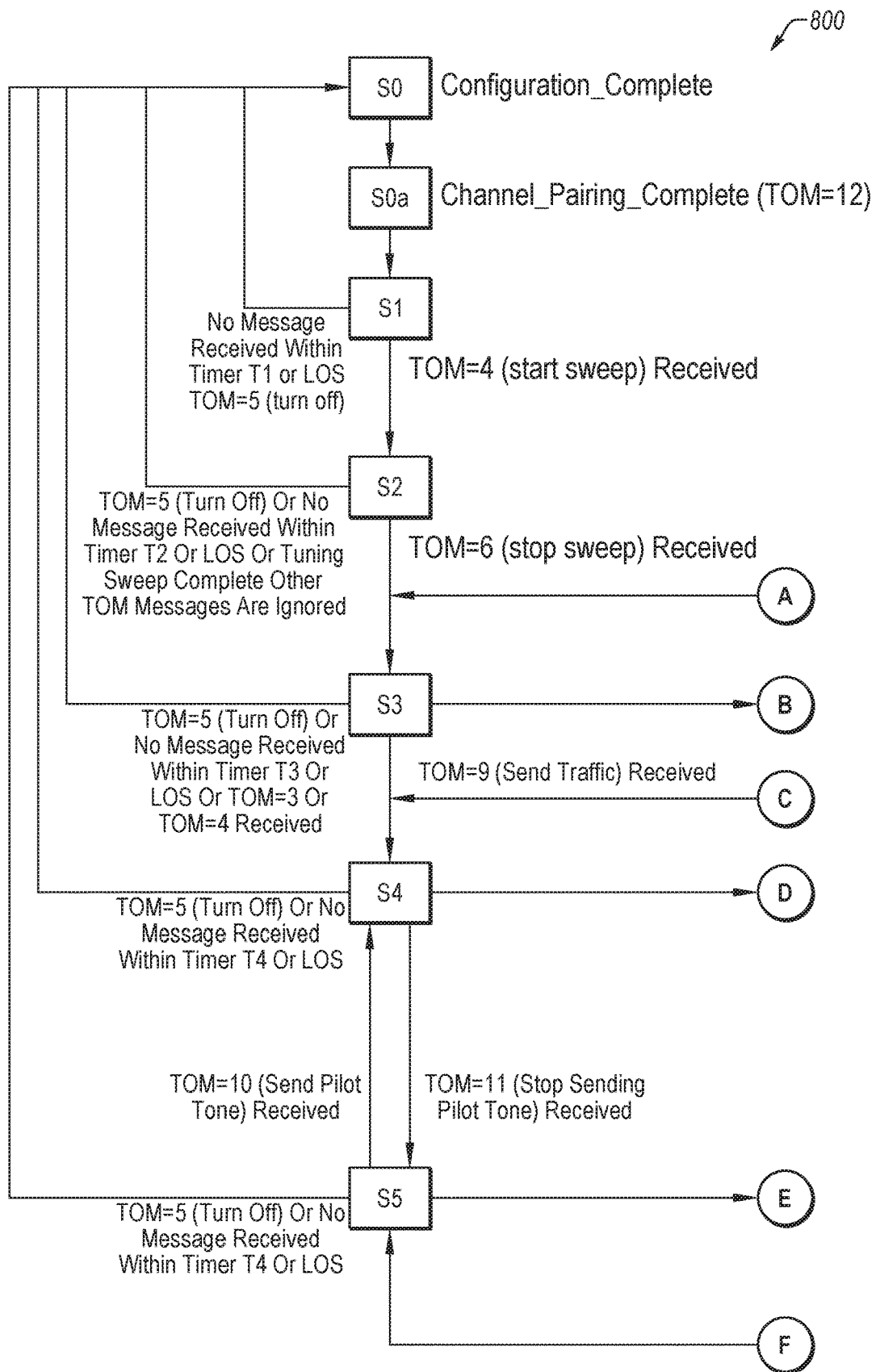
FIGS. 8A-8B illustrate a flowchart of another example method of tuning a transceiver in an optical network that includes a Network Management System (NMS).
Figure 8B:
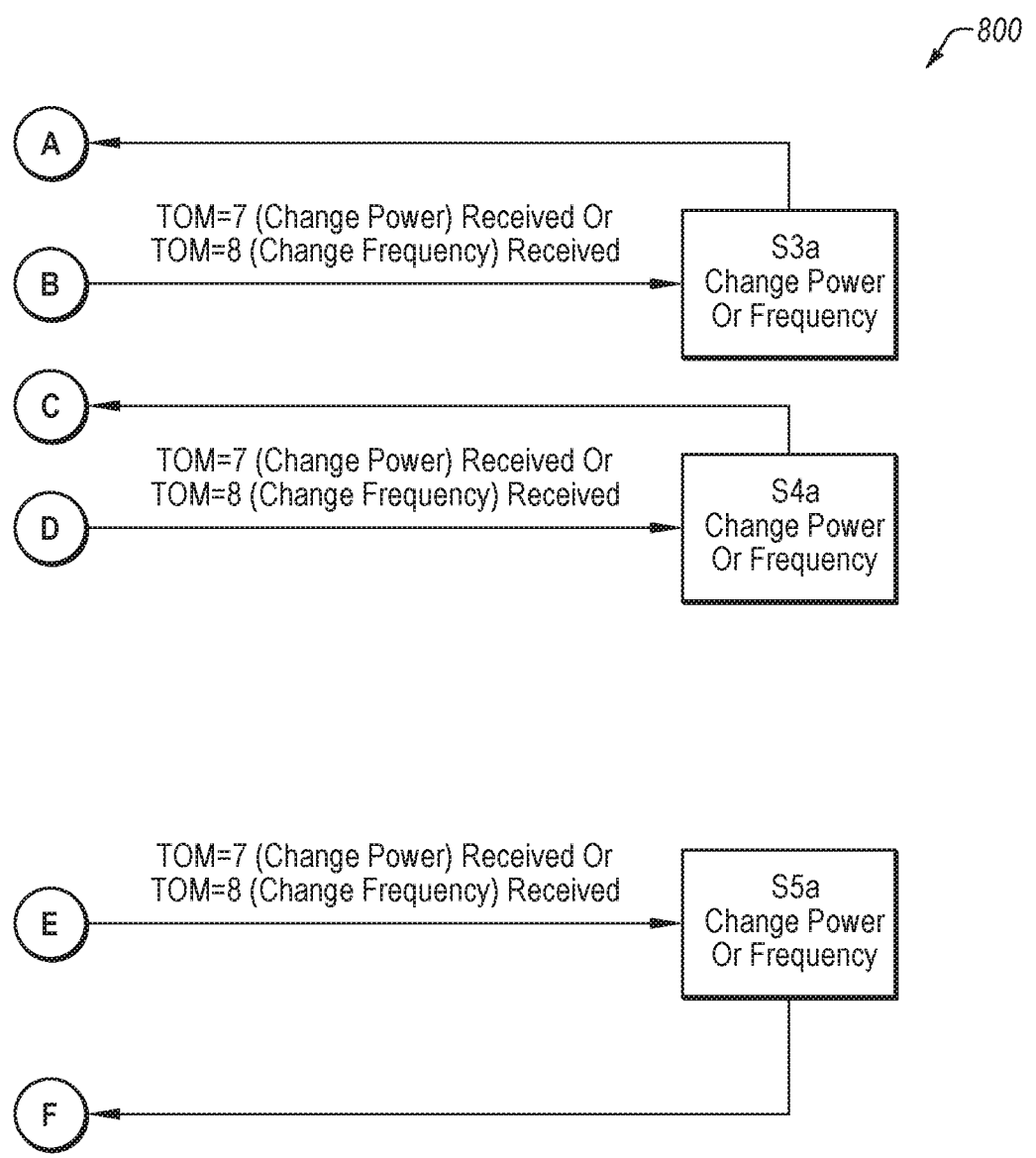

FIGS. 8A-8B illustrate a flowchart of a wavelength tuning configuration 800 for remote site tail-end equipment (TEE). In some circumstances, at least some aspects of the wavelength tuning configuration may be defined in an industry-specified standard, such as ITU-T G.698.4. As illustrated, the configuration 800 may include various states or steps S0, S1, S2, S3, S4, S5, S3a, S4a, S5a for tuning a transceiver. Such state may be specified, for example, in ITU-T G.698.4. However, for self-tuning of wavelength the master transceiver and the slave transceiver, as described above, and additional configuration state S0a may be added for channel pairing. The state S0a may include any suitable aspects of tuning as described above.

FIGS. 8A-8B also includes various TOMs corresponding to the states of the configuration 800, which may also be defined in an industry-specified standard, such as ITU-T G.698.4. Table 3 illustrates a list of the TOMs including the TOM value, message type, and message content.

TABLE 3

| TOM value | Message type | Message content |
|---|---|---|
| 0 | Idle | |
| 1 | Frequency | Nominal optical frequency |
| 2 | Tuning power | Tuning power relationship to received power |
| 3 | Pilot tone frequency | Frequency to be used for TEE to HEE label pilot tone |
| 4 | Start sweep | |
| 5 | Turn off | |
| 6 | Stop sweep | |
| 7 | Change power | New optical power level |
| 8 | Change frequency | Change in optical frequency |
| 9 | Send traffic | |
| 10 | Send pilot tone | |
| 11 | Stop sending pilot tone | |
| 12 | Discovery | Discovery remote transceiver |

TABLE 3-continued

| TOM value | Message type | Message content |
| --- | --- | --- |
| To be assigned | Channel notification during scan | Local channel notification when wavelength and band information has not been defined |
| To be assigned | Channel Detection Acknowledgement | Acknowledgement with local channel information based on the channel information it receives OR Acknowledgement shows that it has received signal |

TOMs with values 0-11 may be specified in ITU-T G.698.4. However, additional TOMs may be implemented for automatic wavelength tuning. For example, additional TOMs for discovery, channel notification during scan, and channel detection acknowledgement may be included for wavelength tuning. In one example, the TOM for discovery may be assigned TOM value 12, although other configurations may be implemented. Accordingly, Table 3 includes TOM 12 for discovery that corresponds to discovery of a remote transceiver. Additional TOMs to be assigned may include channel notification during scan and channel detection acknowledgement as shown in Table 3. The channel notification during scan TOM may be a local channel notification when wavelength and band information has not been defined (e.g., as described in method 500). The channel detection acknowledgement TOM may be an acknowledgement that indicates local channel information has been received based on the channel information or may be an acknowledgement that indicates that the transceiver has received a signal (e.g., as described in method 500).

In some circumstances, the optical network implementing the concepts described herein may include wavelength selective components and/or a wavelength selective optical link. In such configurations, when the specified channel is transmitted through the wavelength selective optical link, the receiver side may be capable of receiving the optical signal based on the configuration of the wavelength selective components, and may respond to setup the optical link with corresponding local wavelength that may be transmitted through the wavelength selective optical link.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The terms and words used in the description and claims are not limited to the bibliographical meanings, but, are merely used to enable a clear and consistent understanding of the disclosure. It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those skilled in the art, may occur in amounts that do not preclude the effect the characteristic was intended to provide.

Aspects of the present disclosure may be embodied in other forms without departing from its spirit or essential characteristics. The described aspects are to be considered in all respects illustrative and not restrictive. The claimed subject matter is indicated by the appended claims rather than by the foregoing description. All changes which come within the meaning and range of equivalency of the claims are to be embraced within their scope.

What is claimed is:

1. A method of tuning optoelectronic transceivers in an optical network with wavelength selective components, the method comprising:
    powering on a first optoelectronic transceiver;
    setting a channel wavelength of the first optoelectronic transceiver;
    transmitting a first request command from the first optoelectronic transceiver through the optical network to a second optoelectronic transceiver; and
    non-iteratively changing a channel wavelength of the first optoelectronic transceiver until a second request command is received from the second optoelectronic transceiver, wherein the second request command indicates to the first optoelectronic transceiver that the channel wavelength set by the first optoelectronic transceiver is able to travel through the optical network between the first optoelectronic transceiver and the second optoelectronic transceiver.

2. The method of claim 1, wherein the non-iteratively changing the channel wavelength of the first optoelectronic transceiver comprises randomly changing the channel wavelength of the first optoelectronic transceiver.

3. The method of claim 1, wherein the first request command identifies that the first optoelectronic transceiver is a master transceiver or a slave transceiver.

4. The method of claim 1, wherein the first request command or the second request command are transmitted as out-of-band optical signals.

5. The method of claim 1, further comprising changing a channel wavelength of the first optoelectronic transceiver in response to a predetermined amount of time passing.

6. The method of claim 1, wherein operating wavelengths of the optical network are separated into wavelength pairs with a first wavelength for one direction and another wavelength for a second opposite direction, and the first optoelectronic transceiver alternates between the wavelengths of the wavelength pairs.

7. The method of claim 1, further comprising transmitting an acknowledgement in response to the second request command being received from the second optoelectronic transceiver.

8. The method of claim 1, wherein channel and/or wavelength information is sent with the first request command.

9. The method of claim 1, wherein the first optoelectronic transceiver is configured to send and receive predetermined types of messages, and the types of messages include a message type for channel notification during scan and for channel detection acknowledgement.

10. A method of tuning optoelectronic transceivers in an optical network, the method comprising:
    powering on a first optoelectronic transceiver;
    receiving a first request command at the first optoelectronic transceiver;
    responding to the first request command;
    setting a channel wavelength of the first optoelectronic transceiver;
    transmitting a second request command including the set channel wavelength of the first optoelectronic transceiver from the first optoelectronic transceiver to a second optoelectronic transceiver; and waiting to receive an acknowledgement command from the second optoelectronic transceiver.

11. The method of claim 10, wherein the first request command identifies that the first optoelectronic transceiver is a master transceiver or a slave transceiver.

12. The method of claim 10, further comprising receiving a second acknowledgement from the second optoelectronic transceiver, the second acknowledgement including confirmation that the second optoelectronic transceiver is set to operate at a channel wavelength as specified in the second request command.

13. The method of claim 10, further comprising randomly or iteratively changing the channel wavelength of the first optoelectronic transceiver if the acknowledgement command is not received after a predetermined amount of time has passed, and transmitting a third request command including a changed channel wavelength.

14. The method of claim 10, further comprising randomly or iteratively changing a wavelength channel of the first optoelectronic transceiver until the acknowledgement command is received.

15. The method of claim 10, further comprising beginning normal operation of the first optoelectronic transceiver at an operational wavelength channel in response to receiving the acknowledgement command from the second optoelectronic transceiver.

16. The method of claim 10, wherein responding to the first request command includes the first optoelectronic transceiver forwarding the first request command to the second optoelectronic transceiver if the request command is related to the second optoelectronic transceiver.

17. The method of claim 10, wherein the first request command is received through the optical network from a network management system or another optoelectronic transceiver.

18. The method of claim 10, wherein the second request command indicates that the second optoelectronic transceiver is to be set at a master or slave operating wavelength.

\* \* \* \* \*